US011429518B2

(12) United States Patent
Tavallaei et al.

(10) Patent No.: US 11,429,518 B2
(45) Date of Patent: Aug. 30, 2022

(54) PAGING IN THIN-PROVISIONED DISAGGREGATED MEMORY

(71) Applicant: Microsoft Technology Licensing, LLC, Redmond, WA (US)

(72) Inventors: Siamak Tavallaei, Spring, TX (US); Ishwar Agarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/115,375

(22) Filed: Dec. 8, 2020

(65) Prior Publication Data

US 2022/0179780 A1    Jun. 9, 2022

(51) Int. Cl.
*G06F 12/00* (2006.01)
*G06F 12/02* (2006.01)
*G06F 12/1072* (2016.01)
*G06F 12/1027* (2016.01)
*G06F 13/16* (2006.01)
*G06F 9/50* (2006.01)

(52) U.S. Cl.
CPC ........ *G06F 12/0238* (2013.01); *G06F 9/5016* (2013.01); *G06F 12/1027* (2013.01); *G06F 12/1072* (2013.01); *G06F 13/1668* (2013.01); *G06F 2209/5011* (2013.01); *G06F 2212/214* (2013.01)

(58) Field of Classification Search
CPC ............ G06F 12/0238; G06F 12/1027; G06F 13/1668; G06F 9/5016; G06F 12/00; G06F 13/00
See application file for complete search history.

(56) References Cited

U.S. PATENT DOCUMENTS

2012/0059989 A1* 3/2012 Hamaguchi ........... G06F 3/0644
711/114
2012/0263191 A1    10/2012 Baron
(Continued)

OTHER PUBLICATIONS

Cao, et al., "Hierarchical Orchestration of Disaggregated Memory", In Journal of IEEE Transactions on Computers, vol. 69, Issue 6, Jun. 1, 2020, pp. 844-855.
(Continued)

*Primary Examiner* — Tuan V Thai
(74) *Attorney, Agent, or Firm* — Alleman Hall Creasman & Tuttle LLP (57) ABSTRACT

Disclosed herein is a thin-provisioned multi-node computer system with a disaggregated memory pool and a pooled memory controller. The disaggregated memory pool is configured to make a shared memory capacity available to each of a plurality of compute nodes, such memory capacity being thinly provisioned relative to the plurality of compute nodes. The pooled memory controller is configured to assign a plurality of memory segments of the disaggregated memory pool to the plurality of compute nodes; identify a subset of the plurality of segments as cold segments, such identification being based on determining that a usage characteristic for each such cold segment is below a threshold; and page one or more of the cold segments out to an expanded bulk memory device, thereby freeing one or more assigned memory segments of the disaggregated memory pool.

19 Claims, 7 Drawing Sheets

(56) References Cited

U.S. PATENT DOCUMENTS

| | | | |
|---|---|---|---|
| 2016/0048532 A1* | 2/2016 | Islam | G06F 16/178 |
| | | | 707/613 |
| 2016/0055097 A1* | 2/2016 | Ki | G06F 12/0871 |
| | | | 711/160 |
| 2017/0039000 A1* | 2/2017 | Feng | G06F 3/0683 |
| 2017/0293447 A1 | 10/2017 | Bivens et al. | |
| 2018/0217750 A1* | 8/2018 | Nguyen | G06F 3/061 |
| 2020/0364189 A1* | 11/2020 | Lee | G06F 21/64 |
| 2020/0371692 A1 | 11/2020 | Van Doorn et al. | |
| 2021/0200667 A1* | 7/2021 | Bernstein | G06F 3/0658 |

OTHER PUBLICATIONS

Maass, et al., "EcoTLB: Eventually Consistent TLBs", In Journal of ACM Transactions on Architecture and Code Optimization, vol. 17, Issue 4, Sep. 30, 2020, 24 Pages.

"International Search Report and Written Opinion Issued in PCT Application No. PCT/US21/058884", dated Feb. 8, 2022, 14 Pages.

* cited by examiner

PAGING IN THIN-PROVISIONED DISAGGREGATED MEMORY

BACKGROUND

Data centers typically include large numbers of discrete compute nodes, such as server computers or other suitable computing devices. The compute nodes may utilize a variable amount of memory, such that actual usage often is significantly below total capacity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Disclosed herein is a thin-provisioned multi-node computer system with a disaggregated memory pool and a pooled memory controller. The disaggregated memory pool is configured to make a shared memory capacity available to each of a plurality of compute nodes, such memory capacity being thinly provisioned relative to the plurality of compute nodes. The pooled memory controller is configured to (1) assign a plurality of memory segments of the disaggregated memory pool to the plurality of compute nodes, (2) identify a subset of the plurality of segments as cold segments, such identification being based on determining that a usage characteristic for each such cold segment is below a threshold, and (3) page one or more of the cold segments out to an expanded bulk memory device, thereby freeing one or more assigned memory segments of the disaggregated memory pool.

DETAILED DESCRIPTION

As discussed above, data centers often have large numbers of server computers or other discrete compute nodes. Such compute nodes may be referred to as "host computing devices," or "hosts," as they may in some cases be used to host a plurality of virtual machines. It will be understood, however, that a compute node as discussed herein may be used for any suitable computing purpose, and need not be used for hosting virtual machines specifically. Furthermore, a host may itself be a virtual machine for purposes of the memory pool scenarios discussed herein. A host/node typically is configured with a designated maximum memory allocation (e.g., 1 GB, 8 GB, 1 TB, 8 TB, or any other suitable memory allocation). Such allocation is essentially a characterization of the directly accessible memory for the node that is provided to the operating system and applications. The designated memory allocation may be provided in part by memory natively attached to a discrete node or machine hosting a node, and in part via use of a pooled memory resource that may be associated with multiple different nodes. In some cases, the memory allocated to a node may be accessed immediately with few restrictions and very low latency, while in other cases coordinated activity may be required to access memory that can potentially be made available to other nodes.

Depending on the specific implementation, each individual compute node may have or be supported by any suitable assemblage of computer hardware. In conventional settings, servers are often provisioned to be substantially self-sufficient, with processing resources, data storage, memory, network interface componentry, power supplies, cooling, etc., so as to enable operation without any need to tap external resources. That said, blade servers or rack nodes sometimes omit cooling, power or other low-level infrastructure, with that functionality being offloaded to shared components that service multiple nodes.

In multi-node settings, workload can vary considerably from node to node. For example, a subset of data center nodes may be tasked with resource-intensive workloads, while other nodes sit relatively idle. Thus, despite some high localized activity, total resource consumption may be relatively low and, due to the way nodes are configured, resources at an idle load cannot be "loaned to" or otherwise consumed by compute nodes where activity is high. This inability to make use of idle resources is inefficient, and is sometimes referred to as "resource stranding." In other words, resources that could potentially be applied to computing tasks are instead stranded in idle or underutilized hosts.

More particularly, with respect to volatile memory, stranding of the memory resource occurs when the average memory consumption/usage is less than the amount of natively-attached memory. For example, if a blade server is provisioned with 512 GB of natively-attached memory, statistical actual usage of 128 GB of memory constitutes significant stranding of the memory resource. This type of inefficiency can be dramatic when scaled across a large number of nodes.

Stranding can be mitigated when hardware resources are pulled out of individual compute nodes and are instead "disaggregated" as separate resource pools that can be flexibly accessed by connected compute nodes. The present disclosure primarily contemplates scenarios in which volatile memory hardware (e.g., random-access memory (RAM)) is disaggregated into a memory pool, and is managed to allow it to be flexibly used by any of a plurality of compute nodes—e.g., in a data center. This serves to alleviate resource stranding, as compute nodes are enabled to obtain and release memory as needed.

In many examples, the amount of memory collectively allocated to the plurality of compute nodes may exceed the total native and pooled memory that is available. In other words, a shared memory capacity may be exposed to the plurality of compute nodes with an individual capacity being virtually available to each of the plurality of compute nodes, such that the total physical memory capacity used in the implementation is less than a total of the individual capacities made virtually available to each of the plurality of compute nodes. This is sometimes referred to as "thin provisioning," of the memory relative to the plurality of compute nodes. In general, in data center environments without thin provisioning, it can be observed that individual compute nodes (and/or virtual machines implemented on the compute nodes) are often provisioned with substantially more resources (e.g., storage space, memory) than the compute nodes end up actually using, statistically over time.

However, when memory is thinly provisioned, a disaggregated pool of memory may experience substantial pressure if multiple different compute nodes attempt to use a large portion of memory simultaneously (e.g., if all of the compute notes attempt to use an amount of memory near their full memory allocations). Memory pressure on the pool, as used herein, refers to instances in which the compute nodes attempt to collectively use more memory than is available in the disaggregated memory pool, or an amount of memory exceeding a threshold that may be predefined or otherwise determined.

Accordingly, the present disclosure discloses techniques for addressing scenarios where heightened demands are placed on pooled memory by using a pooled memory controller. The pooled memory controller is generally configured to manage disaggregated memory (pool memory directly managed by the controller, or external memory such as bulk failover memory or other pool segments managed by other controllers) to honor node assignment requests to assign memory up to the node's total allocation. It will be appreciated that in some examples (e.g., in memory pressure situations where pool usage is above threshold or, more severely, exceeding maximum capacity), the pooled memory controller may not be able to immediately provide physical memory for a requested assignment. Nevertheless, using the techniques of the present disclosure, the pooled memory controller may respond in various ways to pool pressure so as to honor valid requests for more pool memory.

In some examples, the pooled memory controller addresses memory pressure by revoking pool assignments from one or more compute nodes. Revocation may be based on assessment that compute nodes have a lower priority/ need for pool memory currently assigned to them. In these or other examples, memory assignment requests may be routed to a different disaggregated memory pool segment that may still have available memory, i.e. pool memory managed by a different memory controller. For example, the pooled memory controller may be configured to route memory assignment requests to an expanded bulk memory pool. In some examples, pooled memory controller may swap data from the extended memory into another pool segment or into an expanded bulk memory pool, to preserve the swapped-out data. The pooled memory controller may revoke pool assignments and/or swap data in any suitable fashion so as to manage pool pressure to the memory pool, while suitably providing usable memory to the plurality of compute nodes.

Figure 1:
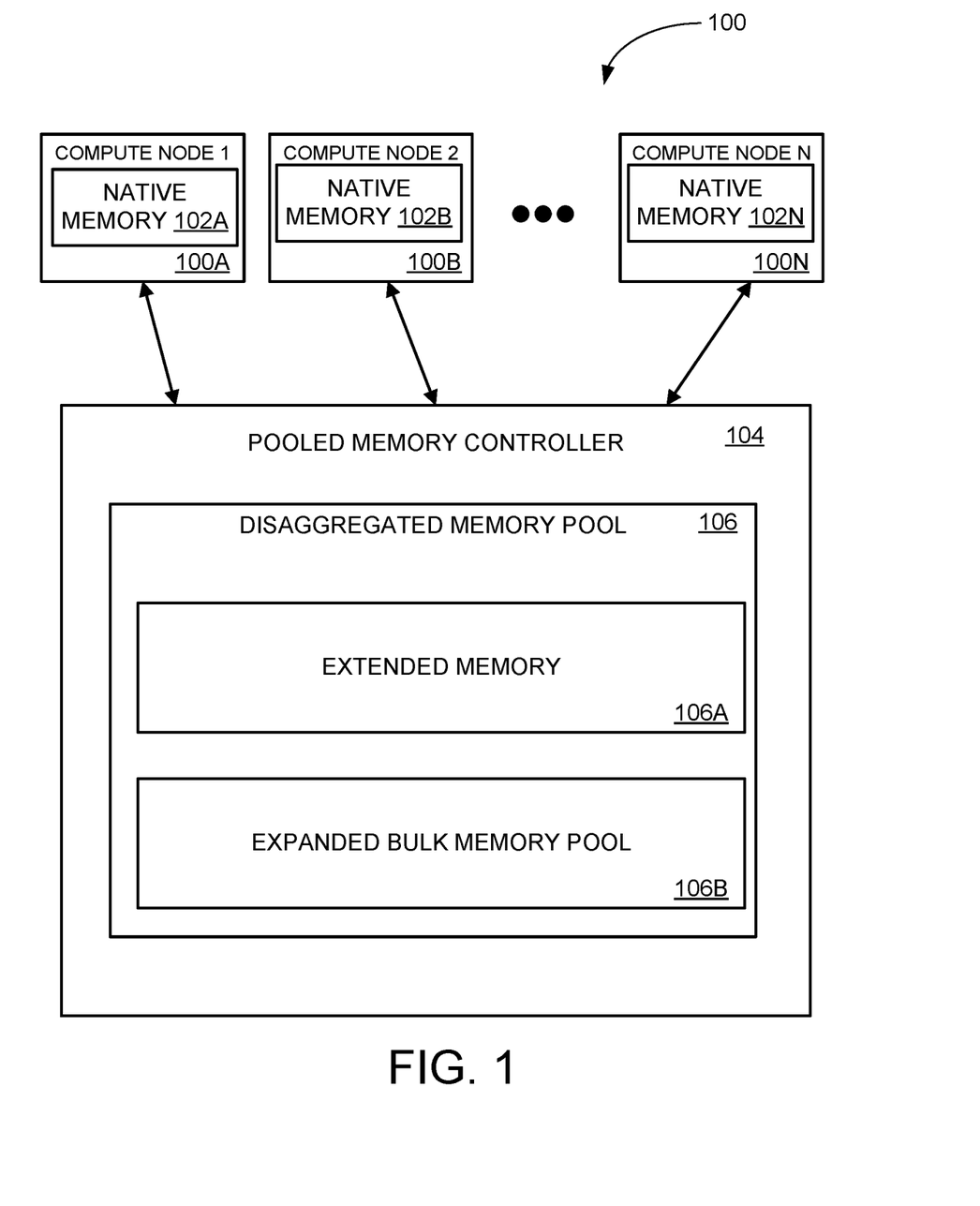
FIG. 1 schematically depicts a plurality of compute nodes coupled with a disaggregated memory pool.

Disaggregation of memory is schematically illustrated with respect to FIG. 1. As shown, a computer system 100 includes a plurality of compute nodes 100A-100N (where N is any suitable positive integer, e.g., tens, hundreds, thousands, millions, or more) coupled with a pooled memory controller 104 that manages access to disaggregated memory resources. These memory resources are in a disaggregated memory pool 106 including an extended memory 106A and an expanded bulk memory 106B. For example, extended memory 106A may comprise a dynamic random-access memory (DRAM) comprising a plurality of DRAM segments (e.g., DRAM segments provided by one or more DRAM devices). For example, expanded bulk memory 106B may comprise an SSD device.

Disaggregated memory pool 106 is configured to make a shared memory capacity (e.g., 1 TB of memory or any other suitable amount of memory) available to each of a plurality of compute nodes via extended memory 106A (e.g., in addition to native memory capacity of the compute nodes). Furthermore, the expanded bulk memory 106B is configured to provide additional storage, for example to provide for overflow of the shared memory capacity. As discussed in more detail below, an important aspect of interaction between the compute nodes 100A, 100B, etc. and memory controller 104 is to intelligently manage the pooled memory resource and avoid undue pressure that would impede flexibly assigning pooled memory to nodes that need additional capacity.

In some examples, each compute node may have a natively-attached memory (e.g., native memory 102A of compute node 100A, native memory 102B of node 100B, and native memory 102N of node 100N). Natively-attached memory may be of any suitable size. In some examples, natively-attached memory may be fault-tolerant (e.g., utilizing redundant-array of independent disks (RAID) techniques). Accordingly, a compute node may be configured to preferentially utilize fault-tolerant native memory for fault-sensitive code and/or data. Preferential use of native memory may also reduce pressure on shared resources. In various examples, dozens, hundreds, thousands, or more individual compute nodes may share access to one or more disaggregated resource pools, including disaggregated memory pool 106.

In some examples, the plurality of compute nodes may each be operatively coupled to pooled memory controller 104 via a high-speed and/or high-throughput bus, e.g., via a photonic interconnect. For example, a photonic interconnect may substantially reduce latency associated with accessing the extended memory 106A by the compute nodes 100A-100N, even when such access is moderated by pooled memory controller 104. In some examples, the photonic interconnect may permit access to the extended memory 106A with minimal latency relative to accessing native memory, e.g., in zero, one, two, or another suitably small number of additional non-uniform memory access (NUMA) hops relative to accessing the native memory. In some examples, a memory-side cache may be incorporated, for example on a memory controller 104, to reduce latency associated with a node reading/writing to pool memory. In some examples, one or more compute nodes of the plurality of compute nodes may include a NUMA-aware memory controller configured to optimize a memory segment layout among one or more of native memory of the compute node and the disaggregated memory pool 106 (e.g., the extended memory 106A, and/or the expanded bulk memory pool 106B). For example, a compute node may be configured to store data that may be frequently accessed in a location within a relatively smaller number of NUMA hops (e.g., in native memory or in the disaggregated memory pool) and to store data that may be less frequently accessed in a location within a larger number of NUMA hops (e.g., in the expanded bulk memory pool).

In some examples, pooled memory controller 104 may include one or more compute express link (CXL)-compliant pooled memory controllers (CPMCs). In some examples, extended memory 106A may be implemented using any suitable type of volatile RAM—e.g., Double Data Rate Synchronous Dynamic RAM (DDR SDRAM). Pooled memory controller 104 may facilitate utilization of the disaggregated memory pool 106 by any or all of the various compute nodes 100A-100N. It will be understood that a disaggregated memory pool may include any suitable number of physical memory units, corresponding to any suitable total memory capacity, and may be governed by one or more different memory control systems. A node in some cases may be confined to using memory behind an individual memory controller 104, or multiple pool segments may be employed, whereas "segment" refers to memory managed by an individual memory controller.

In general, an individual compute node may include a native memory controller and/or other controllers, buses, etc., configured for addressing/accessing native memory. A native memory controller may be configured to determine when a memory access (e.g., read or write) addresses into native memory (i.e., local to and tightly coupled to the resources of the compute node), and thereby handle such access without external reference to the disaggregated memory pool. Furthermore, the native memory controller may be "pool-aware" and configured to determine when a memory access references memory in the disaggregated memory pool. To handle such memory accesses, pool-aware subcomponents of the native memory controller (e.g., via hardware, firmware, and/or software) coordinate as needed to access memory segments managed by the pooled memory controller. In general, software running on the compute node, including the OS, may be largely or totally unaware of the specific location of the accessed memory (e.g., native memory vs. assigned memory from the pool), while still being configured to see a total memory allocation that includes both native and pooled memory. Accordingly, software running on the compute node may be completely unaware and/or agnostic to the specific distribution of allocated memory among native memory and disaggregated memory pool. The native memory controller and/or pooled memory controller may cooperate in any suitable fashion to implement functionality described herein, e.g., memory allocations, memory assignments, memory addressing, and/or memory accesses (e.g., reads and/or writes).

In one example scenario without thin provisioning, a disaggregated memory pool may include 1 TB (1024 GB) of total memory, which may be distributed evenly between eight compute nodes. Furthermore, each compute node may include 128 GB of natively-attached memory (e.g., native memory 102A, native memory 102B, and native memory 102N may each comprise 128 GB of memory local to a corresponding compute node). Thus, each compute node may be assigned 128 GB of memory of the disaggregated memory pool, while having a total of 256 GB of provisioned memory between the natively-attached memory and pooled memory. In aggregate, the eight compute nodes may have access to 2 TB of memory total, again between the natively-attached memory and pooled memory. In this example, as a result of the 128 GB of native memory and 128 GB of pooled memory, each node is allocated 256 GB of memory from the perspective of the node's internal OS and memory system. That is, the node "sees" 256 GB of available memory.

However, it is generally unlikely that each compute node will fully utilize its memory allocation. Rather, in a more common scenario, each compute node may only use a maximum of 50% of its allocated memory during normal usage, and some compute nodes may use significantly less than 50%. As such, even though the 1 TB disaggregated memory pool will be fully assigned to the plurality of compute nodes, only a relatively small fraction of the pooled memory may be in use at any given time, and this represents an inefficient use of the available resources.

Given this, the amount of memory actually available—i.e., "provisioned"—in the memory pool could be reduced without significantly affecting performance of the plurality of compute nodes. For instance, the memory space of each compute node could still be constructed so that the pool portion of its memory allocation was 128 GB (thus amounting to 1 TB when summing the eight nodes), for example by providing an address range for 128 GB remote memory, however, the memory pool could be actually provisioned with only a total of 256 GB. Thus, the amount of allocated memory exceeds the amount of memory that is actually provisioned. In other words, while each compute node may be permitted to use up to 128 GB of pool memory as part of its 256 GB allocation, it is statistically likely that many compute nodes will not use all, or even a significant portion, of that 128 GB at any given time.

Furthermore, memory allocation needs may vary among different compute nodes (e.g., based on different memory requirements for different virtual machines, programs, and/or computing services). For example, a first virtual machine may be allocated 1 TB of memory, whereas a second, different virtual machine may be allocated 2 TB of memory. More generally, different virtual machine may allocate any suitable amount of memory as needed for different computational workloads. Thus, any unused memory assigned to one compute node may be reassigned to one or more of the other nodes. In this manner, any particular compute node may use up to 128 GB of pool memory if needed, while still conserving memory in the disaggregated pool, due to the fact that each compute node typically will not use 128 GB at any given time.

Such thin provisioning may be done to any suitable extent. It is generally beneficial in a multi-node grouping for the amount of available memory—native plus pooled—to exceed the amount of memory used by the compute nodes under typical circumstances. In other words, if the individual compute nodes on average use around 256 GB, then it normally would be desirable to have somewhat more than 256 GB of memory actually provisioned between the natively-attached memory and pooled memory, such that the compute nodes do not exhaust the available memory during normal use. In practice, however, any suitable amount of memory may be provisioned in the disaggregated memory pool, which may have any suitable relationship with the amount of memory allocated to the plurality of compute nodes.

An allocation for a compute node is a maximal amount of memory that compute node may use throughout operation. The allocation may have a corresponding address space size which may exceed physical memory available to the compute note at any given time. This sense of "availability" refers to the natively-attached memory, plus the amount of memory from the pool that is "assigned" for immediate/current use by the node, which during operation is normally less than the maximum amount of pool memory that could be assigned to the node per its allocation. In other words, the node is configured with a visible allocation of memory which corresponds to its natively attached memory plus a maximum amount of pool memory that has been "promised" to the node. The "assignment" of pool memory is a variable amount of memory from the pool that can range from zero up to the maximum amount of pool memory the node is allowed to use. Pool memory may be assigned to a compute node at any time during operation of the computer system. For example, memory may be assigned to a compute node in an initial assignment at boot time or in any subsequent allocation operation, in response to a request to utilize a memory address or a range of memory addresses, or at any other time for any suitable computational purpose. Furthermore, the memory controller of the present disclosure may flexibly control memory assignments, for example to assign additional memory to a compute node as it is needed during operation, to relinquish a previous memory assignment (e.g., so as to free up memory in the memory pool), and/or to manage pool pressure to the memory pool as will be described below.

As just referenced, a compute node may request assignment of physical memory to provide a portion of the allocated address space (e.g., to increase memory usage). For example, the provided portion may include one or more "segments" of memory, where a segment refers to any contiguous portion of memory (e.g., a memory page or any other block of memory aligned to a segment size indicating a smallest granularity of portions of memory managed by the pooled memory controller, e.g., 8 KB segment, 8 MB segment, 1 GB segment, or any other suitable segment size). A memory controller as described herein may respond by providing the requesting compute node with access (e.g., reading and storing data) to one or more segments of physical memory managed by the pool controller.

Although the present disclosure is described with regard to multiple compute nodes and a single pooled memory controller, it will be appreciated that compute nodes may use multiple different pooled memory controllers. For example, compute nodes may be coupled to two or any number of different pooled memory controllers. Alternately or additionally, some compute nodes in a grouping may use a first pooled memory controller, with others using a second pooled memory controller. Multiple pooled memory controllers may be configured for any suitable purpose, e.g., to provide a larger pool of memory resources, to stripe memory assignments across multiple controllers (e.g., to provide redundancy and/or enhanced speed as in a RAID configuration, to provide failover in case of failure of one or more memory controllers and/or failure of associated memory hardware), and/or to provide large, scaled-up computing ecosystems. In some examples, additional pooled memory controllers may be configured to provide an extended pool of disaggregated memory resources (e.g., with each memory controller managing a segment of the memory pool). For example, if a memory assignment would exceed the pre-defined threshold and/or capacity of the first pooled memory controller 104, subsequent assignments and/or data swapping may be done using memory resources provided by a different pooled memory controller (e.g., instead of or in addition to using expanded bulk memory pool as described herein).

Various references are made herein to a pre-defined usage threshold which corresponds to a level of memory pool pressure that triggers responsive actions. In some cases, a static threshold is used—e.g., a fixed amount of usage, a percentage of usage, an activity level. In other cases, the threshold may be dynamic based on operating conditions. For example, behavior patterns may be identified using machine learning models to determine when actionable pressure is placed on the memory pool. Still further, gradations may be employed to identify multiple degrees of memory pressure. In such a case, one set of countermeasures might be employed at a modest level of pressure, with more substantial interventions occurring at higher levels of pressure.

In some examples, expanded bulk memory pool 106B may be discrete from the compute nodes, and typically will have lower associated costs (e.g., financial cost for provisioning, spatial cost within a computing device footprint, and/or power cost for maintaining and/or accessing data within memory), thereby facilitating a larger capacity relative to extended memory 106A. Typically, expanded bulk memory pool 106B may generally have a higher latency for accessing stored data as compared to extended memory 106A. Non-limiting examples of memory technologies for expanded bulk memory pool 106B include hard disk, solid-state drive (SSD), and/or networked resources (e.g., network interface configured to interface with a spatially disparate computing device to access SDRAM memory, hard disk, and/or SSD resources associated with the spatially disparate computing device). In some examples, expanded bulk memory 106B may act as an expanded bulk memory pool for one or more different pooled memory controllers (e.g., pooled memory controller 104 and one or more additional pooled memory controllers associated with different sets of compute nodes may be configured to utilize different segments of expanded bulk memory 106B when necessary).

Whenever a node needs access to a memory segment (e.g., during a memory allocation or assignment or responsive to an attempted memory access), the node may negotiate with the pooled memory controller 104 to determine whether and how much memory the node should be assigned from the disaggregated memory pool 106. For example, negotiating with the pooled memory controller 104 may be performed by a pool-aware subcomponent of the pooled memory controller. For example, if a compute node requests an assignment that would be within the pre-defined threshold and/or capacity (i.e., little or no pressure on the pool), the pooled memory controller 104 may simply provide the full assignment without pressure-mitigating interventions. Assignments to nodes in general will cause the node to stay at or below the maximum amount of memory allocated to the operating system/applications of the node At any point during operation, pooled memory controller 104 may determine whether there is undue pressure on the memory pool. For example, pooled memory controller 104 may make such a determination responsive to a compute node requesting a memory assignment or at any time (e.g., based on total assignments and/or total allocation that could result in future assignments of the compute node and other compute nodes, or based on any suitable logical assessment that current or future allocation may result in further assignments, such as a prediction of increased resource usage by one or more compute nodes). When providing a memory assignment may result in substantial memory pressure, the pooled memory controller 104 may be configured to provide an assignment using other memory resources (e.g., expanded bulk memory pool 106B) and/or to reduce a memory assignment to another node before, after, or concurrent with providing the assignment. Furthermore, pooled memory controller 104 is configured to reduce memory pressure to the memory pool by swapping one or more segments (e.g., portions or slices of any suitable size, such as a predefined size, for example, 8 Kb) of assigned memory from extended memory 106A into expanded bulk memory pool 106B.

The determination of which segments of memory to swap into expanded bulk memory pool 106B to relieve memory pressure may be based on any suitable determination pertaining to a usage characteristic of the memory. For example, a memory segment may be determined to be a "cold segment" based on the usage characteristic being below a predefined threshold, e.g., with "cold" indicating a relatively low usage of the segment based on the usage characteristic as compared to other, "warm" segments. The usage characteristic may be based on one or more of (1) recency and/or frequency of use (e.g., a usage characteristic below the threshold may represent a never-used segment, a least-recently-used segment, or a least-frequently used segment(s)), (2) recency of assignment (e.g., least-recently assigned segment(s)), (4) a logical assessment of impact on future latencies (e.g., a segment of memory that is determined to be unlikely to be used frequently in the future), (5) an assessment latency/timing of transfer to bulk memory (e.g., a segment of memory that is sparsely populated with non-zero data thereby reducing a transfer time to bulk memory), etc.

Accordingly, the pooled memory controller 104 may minimize the potential of fully exhausting the memory resources provided by extended memory 106A, thereby easing upcoming assignments when nodes need more memory from the pool. In other words, if the total memory assignment exceeds the pre-defined threshold and/or approaches the total memory capacity (such as immediately following a successful memory assignment requested by a compute node), the pooled memory controller 104 may immediately and/or pre-emptively take steps to swap data from extended memory 106A into expanded bulk memory 106B so that memory is generally available for any new assignment request.

The pooled memory controller 104 may assign, un-assign, and otherwise manage memory resources in disaggregated memory pool 106 (e.g., managing the distribution of data among extended memory 106A and/or expanded bulk memory pool 106B) according to any suitable methodology, for example by swapping data between extended memory 106A and expanded bulk memory pool 106B (paging) based on the aforementioned usage characteristic (e.g., how recent or frequently a memory portion is used).

Figure 2:
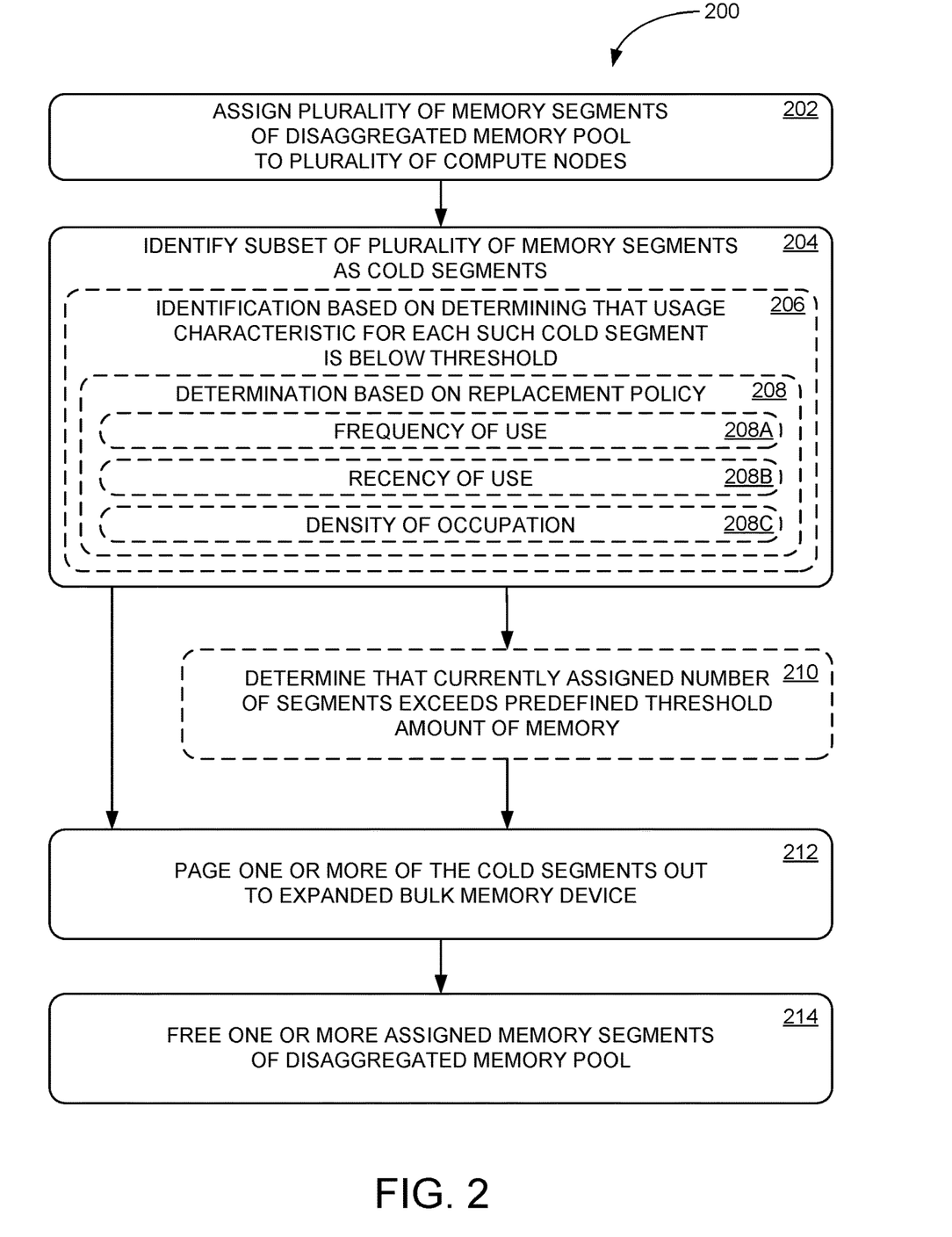
FIG. 2 illustrates an example method of managing memory in a thin-provisioned multi-node computer system.

FIG. 2 shows an example method 200 that may be implemented by pooled memory controller 104. At 202, method 200 includes assigning a plurality of memory segments of a disaggregated memory pool to a plurality of compute nodes.

At 204, method 200 further includes identifying a subset of the memory segments as cold memory segments. Cold segments may be identified based on any suitable determination with regard to usage, for example, based on determining that a usage characteristic for each such cold segment is below a predefined threshold as shown at 206. In some examples, cold segments may be identified based on a logical and/or statistical determination (e.g., instead of or in addition to measurement of a usage characteristic relative to a predefined threshold), for example via machine learning. For example, a machine learning algorithm or statistical process (e.g., recurrent neural network) may be operated to learn a usage pattern of the disaggregated memory, for example by detecting a number of assignments associated with a particular event, schedule, or context (e.g., detecting an increase in requests at certain times of day, based on activity of one or more nodes, based on execution of one or more particular computer programs, based on detecting a particular pattern of memory-side cache activity, and/or based on any other suitable data). In some examples, as shown at 208, determining that the usage characteristic for a segment is below the predefined threshold may be based on a replacement policy dictating when to page out memory segments. For example, as shown at 208A, the replacement policy may be based on frequency of use (e.g., identifying a memory segment with a frequency of usage below a predefined threshold, such as a least-frequently-used segment). Alternately or additionally, as shown at 208B, the replacement policy may be based on a recency of use (e.g., memory segment with recency of use below predefined threshold, such as a least-recently-used segment). Alternately or additionally, as shown at 208C, the replacement policy may be based on a density of occupation (e.g., memory segment with a proportion of non-zero data below a predefined threshold). The above examples of replacement policies are non-limiting, and the determination of usage characteristic and/or identification of cold segment(s) may be based on any suitable determination (e.g., based on assessing a relatively small performance penalty for paging out a segment, based on assessing a relatively large performance gain for freeing up resources associated with a segment, and/or based on any other logical condition or based on a statistical or machine learning process).

At 212, method 200 further includes moving data from one or more of the cold segments out to an expanded bulk memory device, herein referred to as paging. Accordingly, at 214, the paging of cold segments results in freeing up one or more assigned memory segments of the disaggregated memory pool. In some examples, paging out the one or more cold segments at 212 is responsive to determining that a currently assigned amount of memory segments assigns a predefined threshold amount of memory as shown at 210. For example, such determination may be made in the process of assigning memory to a compute node, e.g., responsive to assigning a new segment to one of the plurality of compute nodes such that the new assignment causes a total assigned number of segments to exceed the predefined threshold. In some examples, the predefined threshold may be exceeded by assigning memory to one of the original plurality of compute nodes already assigned memory by the pooled memory controller. In other examples, recognizing the currently assigned number of segments exceeds the predefined threshold may be responsive to assigning a new segment to a new compute node not in the original plurality of compute nodes. Alternately or additionally, paging out the one or more cold segments at 212 may be done at any other suitable time, for example, according to a pre-determined schedule, according to recognizing a logical condition or statistical condition of memory usage, and/or pre-emptively to free up memory of the disaggregated memory pool.

Figure 3:
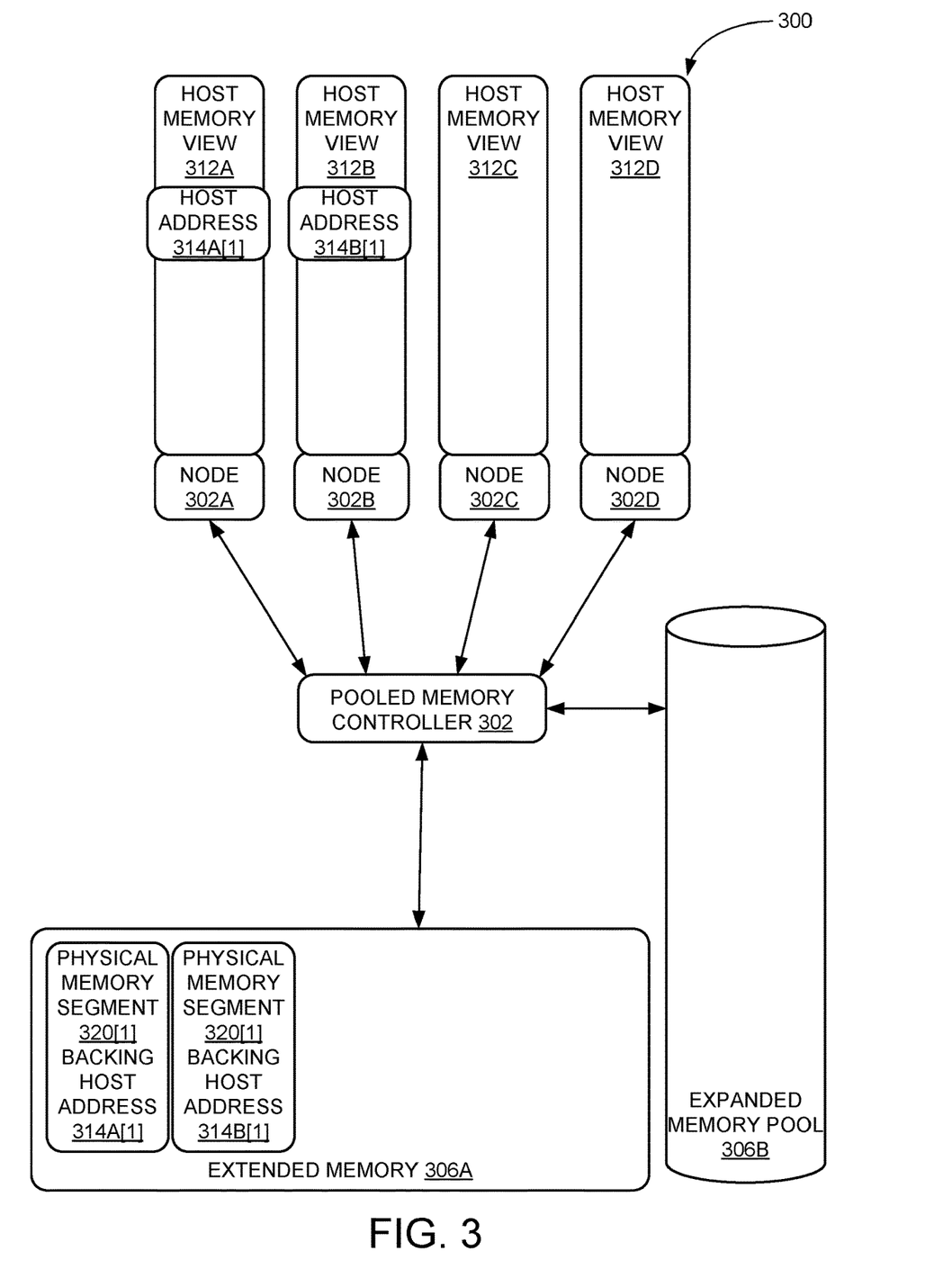
FIGS. 3-4 schematically depict memory addresses used by compute nodes during operation and corresponding physical memory locations in a disaggregated memory pool.

FIGS. 3-6 schematically depict an example of a memory management process according to method 200. FIG. 3 shows a computer system 300 including a pooled memory controller 302 configured to provide memory (e.g., using extended memory 306A and/or expanded memory pool 306B) to a plurality of compute nodes 310 (e.g., compute nodes 310A, 310B, 310C, and 310D). Although FIG. 3 depicts four compute nodes, any suitable number of compute nodes may be used. Each of the compute nodes has its own associated perspective on memory defined by host memory addresses (e.g., numerical or symbolic address data actually being used by a host compute node) within a virtual memory space that may be allocated by the compute node, e.g., corresponding host memories 312A, 312B, 312C, and 312D. In FIG. 3, the first compute node 310A has an allocated memory segment with a host memory address 314A[1]. As will be described herein, host memory addresses are converted into physical memory addresses representing specific locations within the disaggregated memory pool, by pooled memory controller 302.

Pooled memory controller 302 is configured to implement the allocation of some or all of the host memory addresses via physical memory segments. In general, pooled memory controller 302 may be configured to map host memory addresses used by each of the plurality of compute nodes to memory segments of the disaggregated memory pool, for example, by maintaining mappings between host memory addresses and physical addresses in extended memory 306A and/or expanded bulk memory 306B. The plurality of mappings between host memory addresses and physical addresses in the disaggregated memory pool may be maintained in a segment table. In some examples, the usage characteristic for each memory segment may be tracked in the segment table, e.g., by maintaining timestamps, counters, etc., to indicate recency of usage, frequency of usage, density of occupation, etc. Among other things, such a table may be used in assessing whether a memory segment is "cold," as discussed herein. The segment table may be maintained in a dedicated/private portion of the extended memory 306A or in any other memory device(s).

In some examples, a plurality of mappings from the segment table may be cached by the pooled memory controller in a translation lookaside buffer (TLB). For example, the translation lookaside buffer may be a low-latency storage device included in memory controller 302, e.g., a register or on-die memory cache. In some examples, the segment table may be a multi-level segment table configured to map ranges of host addresses to physical addresses, and to map offsets relative to reference host addresses to physical offsets (e.g., corresponding to addresses within a mapped range of host addresses). In some examples, the pooled memory controller may be configured to expose, to each of the compute nodes, a hardware aperture for accessing mapped memory addresses in the extended memory and bulk memory pool. Accordingly, the hardware aperture may automatically handle mapping host memory addresses to physical addresses in the extended memory and/or bulk memory pool.

For example, host memory address 314A[1] is allocated via physical memory segment 320[1] in extended memory 306A. Similarly, the second compute node 310B has two allocated memory segments with host memory addresses 314B[1] provided by pooled memory controller 302 via physical memory segment 320[2].

Figure 4:
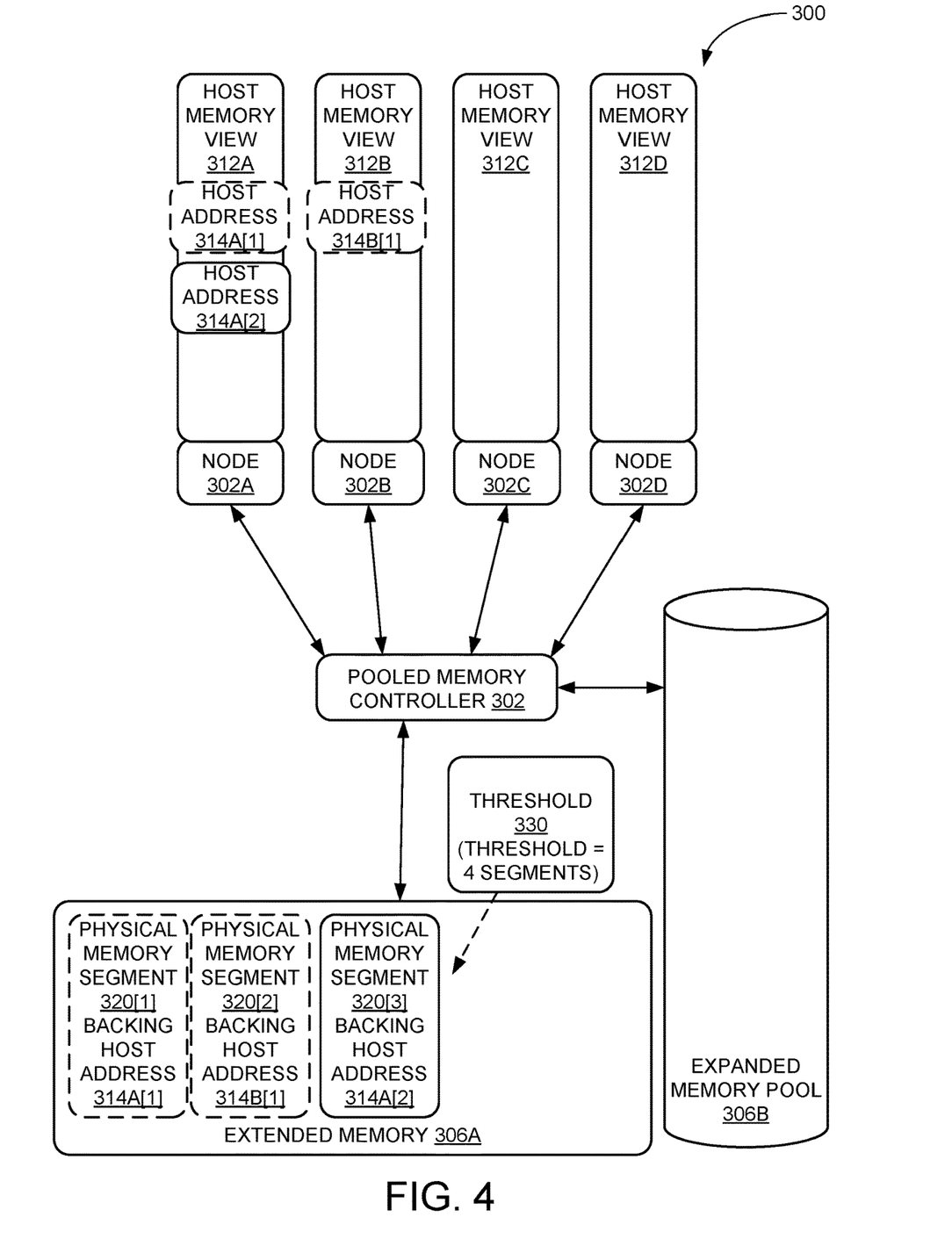

FIG. 4 shows computer system 300 at a different time, when different memory assignments have been provided by pooled memory controller 302 to the plurality of compute nodes. For example, FIG. 4 may represent a subsequent time after the compute nodes have requested and been assigned additional memory. As shown, compute node 310A has additional memory assignments including host memory address 314A[2] mapped to physical memory segment 320[3]. It will be appreciated that the scenario of FIG. 4 is a simplistic incremental variation from the scenario of FIG. 3. To facilitate understanding. During actual operation, assignments may vary significantly and rapidly.

Pooled memory controller 302 may map host memory addresses into the disaggregated memory pool in any suitable order, e.g., in an order determined by memory controller 302 irrespective of host memory address values. In other words, the numbering and spatial arrangement of the physical memory segments 320[1], 320[2], etc., in FIG. 3-6 is a non-limiting, schematic depiction of a portion of extended memory 306A being occupied. The memory segments need not be arranged in any particular order or spatial arrangement, for example, the memory segments may be provided via any suitable contiguous or non-contiguous portions of extended memory 306A. Furthermore, the memory segments in physical memory need not correspond to the host memory addresses, for example, host memory address 314A[1] may be at a low-numbered memory address within compute node 312A's perspective of the memory while host memory address 314A[2] is at a high-numbered memory address within compute node 312A's perspective of the memory (e.g., as depicted in the figure) while these memory addresses may be mapped by memory controller 302 to any suitable locations in the extended memory 306A (e.g., both memory addresses may be mapped to low-numbered memory segments in extended memory 306A, as a non-limiting example). In some examples, the mapping between host memory addresses and physical memory may be determined based on a memory policy, e.g., a fault containment policy or a performance optimization policy. For example, host memory addresses may be mapped to contiguous or non-contiguous portions of physical memory in accordance with the policy.

At any given time, some of the memory segments may be "cold," such as indicated in FIG. 4 with a dashed border (shown in both the host memory perspective and the schematic depiction of physical memory). Cold memory segments may be identified in any suitable manner, for example based on a usage characteristic being below a threshold as described above with regard to FIG. 2. For example, in FIG. 4, the memory segments corresponding to host memory address 314A[1] (mapped to physical memory segment 320[1] and 314B[1] (mapped to memory segment 320[2] are indicated as cold. In some examples, one or more segments may be designated as "pinned" segments that are held in the extended memory regardless of usage characteristic, e.g., pinned segments are not available to swap.

FIG. 4 also depicts an exemplary pre-defined threshold 330 for detecting memory pressure, e.g., a threshold amount of memory segments of extended memory pool 306A which if exceeded indicates that pool pressure may be occurring and/or likely to occur, for example relative to a total capacity of extended memory pool 306A. As a non-limiting example, if extended memory pool 306A has a total of 6 segments, the pre-defined threshold 400 may be 4 segments (e.g., indicating that if 4 segments are occupied, the pool is likely to experience substantial memory pressure as only 2 segments remain). It will be understood that system 300 is a highly simplified, non-limiting example. A pooled memory controller may be configured to provide access to an extended memory including any suitable number of memory segments of any suitable size, for example, thousands or millions of segments. Similarly, a pre-defined threshold for detecting memory pressure may be based on any suitable number of segments and/or proportion of extended memory, for example, based on more than two-thirds, three-quarters, or any other suitable proportion of the extended memory segments being allocated.

Figure 5:
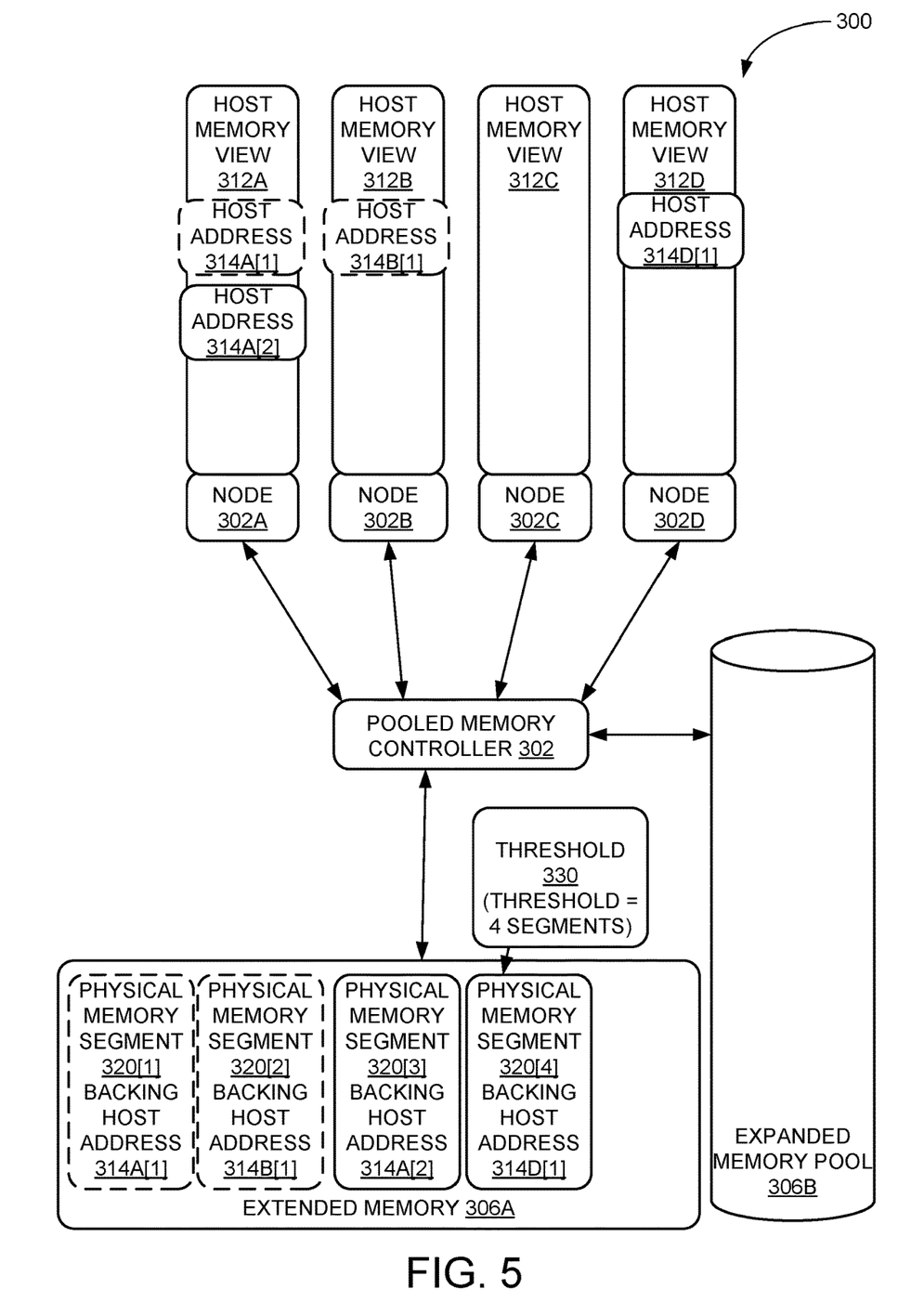
FIG. 5 schematically depicts a disaggregated memory pool at a time when total memory assignments exceed a predefined threshold amount.

FIG. 5 depicts a situation when the total memory assignments exceed the predefined threshold 330, e.g., when compute node 310D has host memory address 314D[1] mapped to physical memory segment 320[4], such that there are 4 total segments of extended memory 306A in use. As such, due to the predefined threshold 330 being exceeded, the pooled memory controller 302 may be configured to respond to memory pressure, for example, by paging data from the extended memory 306A to the expanded bulk memory 306B. as will be shown in FIG. 6.

Figure 6:
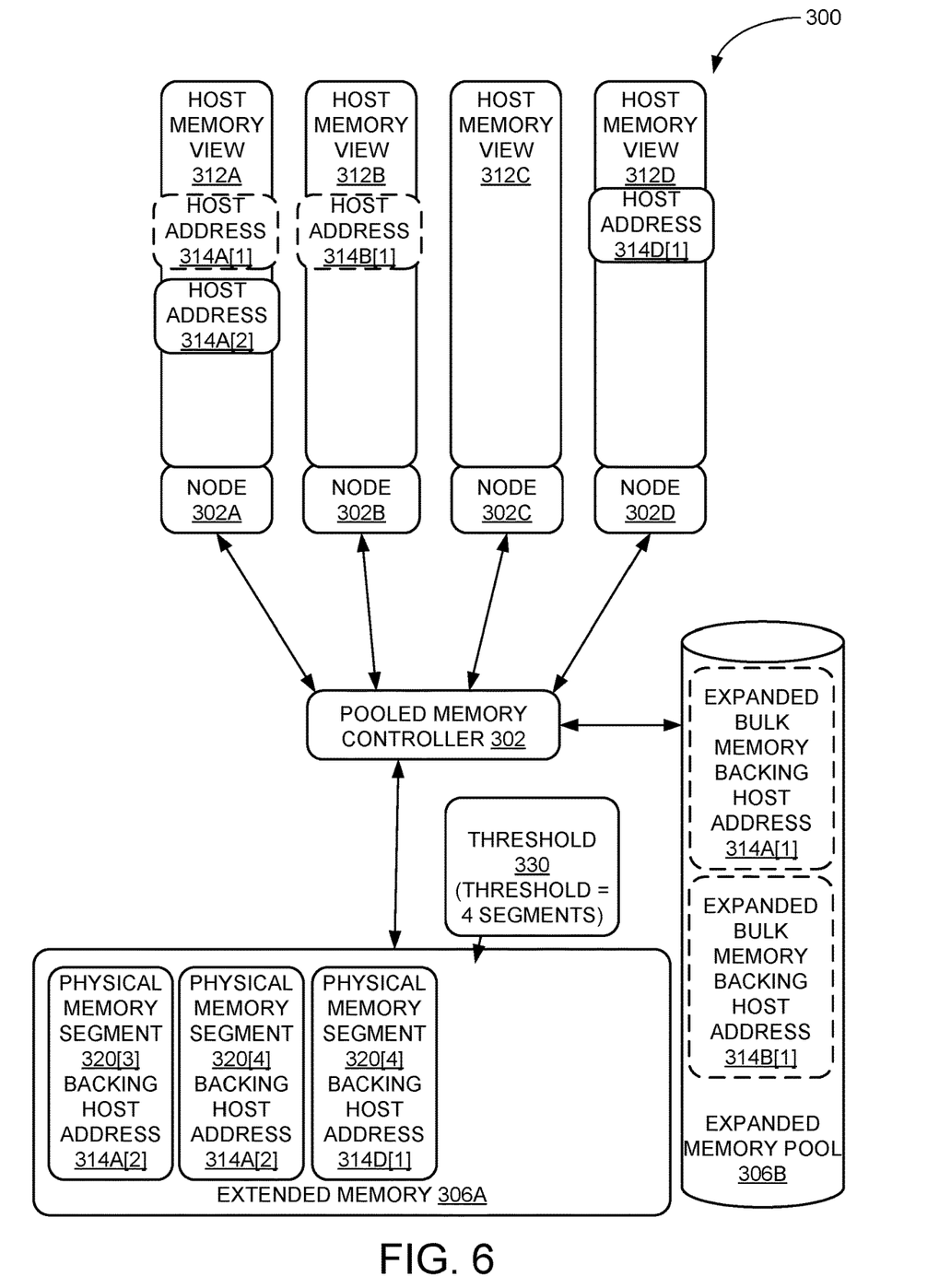
FIG. 6 schematically depicts paging data from the extended memory to an expanded bulk memory of the disaggregated pool to decrease pressure on the extended memory.

FIG. 6 schematically depicts pooled memory controller 302 paging data from the extended memory 306A to expanded bulk memory 306B, thereby decreasing pressure on the extended memory 306A. For example, paging data may be done in response to the total memory assignments exceeding the predefined threshold 330. For example, expanded bulk memory 306B may be configured to store a very large amount of data (e.g., gigabytes, terabytes, or more data) thereby potentially being useable to page out a large number of segments (e.g., hundreds, thousands, millions, or more segments) from extended memory 306A. Alternately or additionally, paging data may be done at any other suitable time, e.g., pre-emptively or in response to a logical and/or statistical condition (as described above with regard to FIG. 2). As shown in FIG. 6, the "cold" segments are mapped into expanded bulk memory 306B. Paging data out may be done in any suitable manner, for example, data from each cold segment may be copied into a suitable location within expanded bulk memory 306B, thereby preserving the data for potential subsequent access by the compute nodes. Accordingly, the physical memory segments in extended memory 306A may be freed up, thereby reducing total occupancy of extended memory 306A. As shown, after swapping out cold segments, the total occupancy of extended memory 306A may be below the predefined threshold 330, e.g., thereby permitting subsequent memory assignments without filling up extended memory 306A. Accordingly, the pooled memory controller 302 is able to provide more memory space out of extended memory 306A to the plurality of compute nodes.

As memory is allocated or becomes cold similar to the process depicted in FIGS. 3-6, pooled memory controller 302 may page out cold memory segments at any suitable time as shown in FIGS. 3-6 and as described with regard to FIG. 2. Accordingly, the compute nodes may readily allocate host memory addresses and pooled memory controller 302 may map the host memory addresses to assigned memory segments in extended memory 306A. It will be appreciated that a latency to access data stored in extended memory 306A may be less than a latency to access memory in expanded memory pool 306B. Accordingly, by ensuring that space in extended 306A is primarily used for data that is not in cold segments, the compute nodes may be able to more efficiently access data in the utilized portions of extended memory 306A and efficiently allocate other portions of extended memory 306A, while data from cold segments is maintained in expanded bulk memory 306B. Since data from cold segments may be unlikely to be used (e.g., based on the usage characteristic), there may be little or no impact to efficiency of data access by the compute nodes by the storage of such data within expanded bulk memory 306B.

FIGS. 3-6 depict a situation when an initial predefined threshold amount of memory is exceeded causing the pooled memory controller 302 to page out cold segments. In some examples, a second, different threshold amount of memory for paging out cold segments may be set (predefined or otherwise determined), for example, responsive to the initial predefined threshold amount of memory being exceeded. As an example, after an initial situation when memory pressure occurs (e.g., as depicted in FIG. 5), the pooled memory controller 302 may be configured to pre-emptively page out cold segments, for example based on setting a lower threshold amount of memory at which to page out cold segments.

In some examples, a compute node may subsequently access a host memory address corresponding to a segment that was previously determined to be cold and swapped out into expanded bulk memory 306B. Accordingly, pooled memory controller 302 is configured to provide access to the data in expanded bulk memory 306B. In some examples, pooled memory controller 302 is configured to determine that data from a cold segment that was paged out into the expanded bulk memory 306B satisfies a retrieval condition, and to page the data back into extended memory 306A from expanded bulk memory 306B responsive to the retrieval condition being met. For example, the retrieval condition may include any access to the data (e.g., once data from a cold segment that was paged out into expanded bulk memory 306B is requested by a compute node, the segment may be considered to no longer be cold and the data may be moved back into extended memory 306A and the host memory address re-mapped to extended memory 306A to provide efficient access). As another example, the retrieval condition may include a second measurement of the usage characteristic being above the usage threshold, e.g., the data may be initially accessed via bulk memory 306B but if the data is accessed with sufficient frequency or if the corresponding portion of bulk memory 306B becomes more densely occupied with data in active usage, the data may be moved back into extended memory 306A and the host memory address may be re-mapped to extended memory 306A. In other examples, the retrieval condition may be based on a calculated prediction of anticipated access to data (e.g., retrieving a data from expanded bulk memory corresponding to a first host memory address based on a second, nearby host memory address being utilized). In general, data may be retrieved from expanded bulk memory 306B and paged back into extended memory 306A at any suitable time, for example, if memory pressure has fallen below a threshold. In some examples, if memory pressure has been alleviated or increased, the predefined usage characteristic threshold and/or predefined threshold 330 may be shifted to modulate the tendency to swap data from extended memory 306A to expanded bulk memory 306B (e.g., decreasing the usage characteristic threshold to detect cold segments so that segments may be considered "warm" until a lower frequency of usage, recency of usage, etc.; or increasing the predefined threshold 330 so that more memory occupation is tolerated before cold segments are swapped).

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
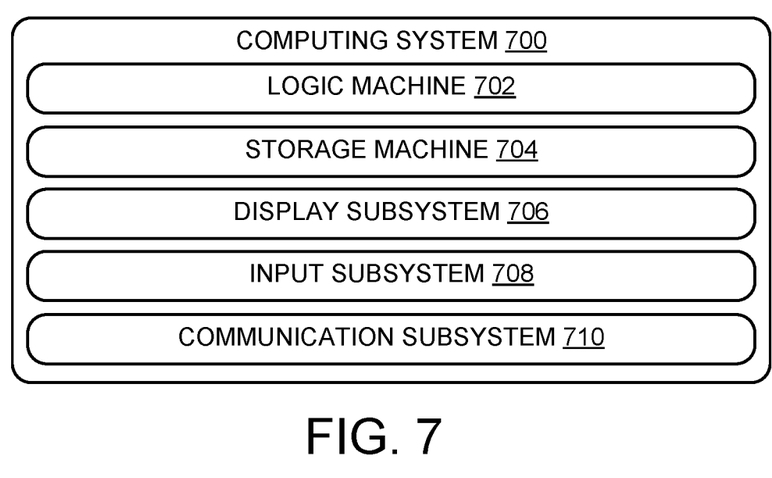
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. For example, computing system 700 may exemplify one or more aspects of the computer system 100 depicted in FIG. 1 or the system 300 depicted in FIGS. 3-6. Computing system 700 may implement method 200 depicted in FIG. 2.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices. For example, storage machine 704 may include a pooled memory controller configured to access an extended memory and/or an expanded bulk memory as described herein.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a thin-provisioned multi-node computer system is provided, comprising (1) a disaggregated memory pool configured to make a shared memory capacity available to each of a plurality of compute nodes, such memory capacity being thinly provisioned relative to the plurality of compute nodes; and (2) a pooled memory controller. The pooled memory controller is configured to (1) assign a plurality of memory segments of the disaggregated memory pool to the plurality of compute nodes; (2) identify a subset of the plurality of memory segments as cold segments, such identification being based on determining that a usage characteristic for each such cold segment is below a usage threshold; and (3) page one or more of the cold segments out to an expanded bulk memory device, thereby freeing one or more assigned memory segments of the disaggregated memory pool.

In this and other examples, the memory segments are DRAM segments. In these and other examples, the expanded bulk memory may be an SSD device. In this and other examples, determining that a usage characteristic is below a usage threshold may be based on a replacement policy, which may include (1) frequency of use of a memory segment, (2) recency of use of a memory segment, and/or (3) density of occupation of a memory segment. In this and other examples, paging out the cold segments may be responsive to determining that a currently assigned amount of memory segments exceeds a first predefined threshold amount of memory, which may be responsive to assigning a new memory segment to one of the plurality of compute nodes. Additionally, or alternatively, determining the currently assigned number of memory segments exceeds the predefined threshold can be responsive to assigning a new memory segment to a new compute node not in the original plurality of compute nodes. The pooled memory controller may be further configured to page out cold segments responsive to determining that a currently assigned number of memory segments exceeds a second predefined threshold amount of memory. The pooled memory controller may be further configured to determine that data from a cold segment that was paged out to the expanded bulk memory satisfies a retrieval condition, and to page the data back into a memory segment in the extended memory. The retrieval condition may include assessing an access to the data and/or a second measurement of the usage characteristic for the cold segment being above the usage threshold. The pooled memory controller may (1) maintain a plurality of mappings between host memory addresses used by each of the plurality of compute nodes and memory segments of the disaggregated memory pool, such mappings being variable to indicate data being paged out from a memory segment and/or (2) map host memory addresses into the disaggregated memory pool in an order determined by the pooled memory controller irrespective of host memory address value. The mappings may be maintained in a segment table and the usage characteristic for memory segments is tracked in the segment table. A plurality of mappings from the segment table are cached by the pooled memory controller in a translation lookaside buffer.

In another example, A thin-provisioned multi-node computer system is disclosed, including (1) a disaggregated memory pool configured to make a shared memory capacity available to each of a plurality of compute nodes; and (2) a pooled memory controller. The pooled memory controller is configured to (1) assign a plurality of dynamic random-access memory (DRAM) segments of the disaggregated memory pool to the plurality of compute nodes; (2) identify a subset of the plurality of DRAM segments as cold segments, such identification being based on determining that a usage characteristic for each such cold segment is below a usage threshold; and (3) page one or more of the cold segments out to a solid state drive (SSD) device, thereby freeing one or more unassigned DRAM segments of the disaggregated memory pool.

In still another example, a method of managing memory in a thin-provisioned multi-node computer system is provided. The method includes (1) assigning a plurality of memory segments of a disaggregated memory pool configured to make a shared memory capacity available to each of a plurality of compute nodes to the plurality of compute nodes; (2) identifying a subset of the plurality of memory segments as cold segments, such identification being based on determining that a usage characteristic for each such cold segment is below a usage threshold; and (3) paging one or more of the cold segments out to an expanded bulk memory device, thereby freeing one or more assigned memory segments of the disaggregated memory pool.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A thin-provisioned multi-node computer system, comprising:
   a disaggregated memory pool configured to make a shared memory capacity available to each of a plurality of compute nodes, such memory capacity being thinly provisioned relative to the plurality of compute nodes;
   a pooled memory controller configured to:
      assign a plurality of memory segments of the disaggregated memory pool to the plurality of compute nodes;
      identify a subset of the plurality of memory segments as cold segments, such identification being based on determining that a usage characteristic for each such cold segment is below a usage threshold; and
      responsive to determining that a currently assigned number of memory segments exceeds a first predefined threshold amount of memory, page one or more of the cold segments out to an expanded bulk memory device, thereby freeing one or more assigned memory segments of the disaggregated memory pool.

2. The computer system of claim 1, wherein the memory is a dynamic random-access memory (DRAM) and the memory segments are DRAM segments.

3. The computer system of claim 1, wherein the expanded bulk memory is an SSD device.

4. The computer system of claim 1, wherein determining that a usage characteristic is below a usage threshold is based on a replacement policy.

5. The computer system of claim 4, wherein the replacement policy includes frequency of use of a memory segment.

6. The computer system of claim 4, wherein the replacement policy includes recency of use of a memory segment.

7. The computer system of claim 4, wherein the replacement policy includes density of occupation of a memory segment.

8. The computer system of claim 1, wherein determining the currently assigned number of memory segments exceeds the first predefined threshold is responsive to assigning a new memory segment to one of the plurality of compute nodes.

9. The computer system of claim 1, wherein determining the currently assigned number of memory segments exceeds the first predefined threshold is responsive to assigning a new memory segment to a new compute node not in the original plurality of compute nodes.

10. The computer system of claim 1, wherein the pooled memory controller is further configured to page out cold segments responsive to determining that a currently assigned number of memory segments exceeds a second predefined threshold amount of memory.

11. The computer system of claim 1, wherein the pooled memory controller is further configured to determine that data from a cold segment that was paged out to the expanded bulk memory satisfies a retrieval condition, and to page the data back into a memory segment in the extended memory.

12. The computer system of claim 11, wherein the retrieval condition includes an access to the data.

13. The computer system of claim 11, wherein the retrieval condition includes a second measurement of the usage characteristic for the cold segment being above the usage threshold.

14. The computer system of claim 1, wherein the pooled memory controller maintains a plurality of mappings between host memory addresses used by each of the plurality of compute nodes and memory segments of the disaggregated memory pool, such mappings being variable to indicate data being paged out from a memory segment.

15. The computer system of claim 14, wherein the pooled memory controller maps host memory addresses into the disaggregated memory pool in an order determined by the pooled memory controller irrespective of host memory address value.

16. The computer system of claim 14, wherein the plurality of mappings is maintained in a segment table and the usage characteristic for memory segments is tracked in the segment table.

17. The computer system of claim 16, wherein a plurality of mappings from the segment table are cached by the pooled memory controller in a translation lookaside buffer.

18. A thin-provisioned multi-node computer system, comprising:
   a disaggregated memory pool configured to make a shared memory capacity available to each of a plurality of compute nodes;
   a pooled memory controller configured to:
      assign a plurality of dynamic random-access memory (DRAM) segments of the disaggregated memory pool to the plurality of compute nodes;
      identify a subset of the plurality of DRAM segments as cold segments, such identification being based on determining that a usage characteristic for each such cold segment is below a usage threshold; and
      responsive to determining that a currently assigned number of memory segments exceeds a first predefined threshold amount of memory, page one or more of the cold segments out to a solid state drive (SSD) device, thereby freeing one or more unassigned DRAM segments of the disaggregated memory pool.

19. A method of managing memory in a thin-provisioned multi-node computer system, comprising:
   assigning a plurality of memory segments of a disaggregated memory pool configured to make a shared memory capacity available to each of a plurality of compute nodes to the plurality of compute nodes;
   identifying a subset of the plurality of memory segments as cold segments, such identification being based on determining that a usage characteristic for each such cold segment is below a usage threshold; and
   responsive to determining that a currently assigned number of memory segments exceeds a first predefined threshold amount of memory, paging one or more of the cold segments out to an expanded bulk memory device, thereby freeing one or more assigned memory segments of the disaggregated memory pool.

* * * * *